(12) United States Patent
Nodoushani et al.

(10) Patent No.: US 6,529,729 B1
(45) Date of Patent: *Mar. 4, 2003

(54) METHOD AND APPARATUS FOR OVER-THE-AIR SERVICE PROVISIONING OF A MOBILE TELEPHONE

(75) Inventors: Paiman Nodoushani, Shelton, CT (US); David Brukman, Shelton, CT (US)

(73) Assignee: Ulysses Holdings, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/707,687

(22) Filed: Nov. 7, 2000

Related U.S. Application Data

(63) Continuation of application No. 09/028,071, filed on Feb. 23, 1998.

(51) Int. Cl.[7] ................................................ H04M 3/00
(52) U.S. Cl. ........................ 455/419; 455/419; 455/418; 370/338
(58) Field of Search ................................. 455/419, 418, 455/414, 423; 370/338, 352, 354, 522, 524; 379/230, 207, 229; 709/229, 249

(56) References Cited

U.S. PATENT DOCUMENTS 6,144,849 A * 11/2000 Nodoushani et al. ........ 455/419

* cited by examiner

*Primary Examiner*—Nay Maung
*Assistant Examiner*—Raymond Persino
(74) *Attorney, Agent, or Firm*—Pennie & Edmonds LLP (57) ABSTRACT

An object-oriented over-the-air service provisioning (OTASP) computer program is disclosed. The OTASP program is implemented in a client-server architecture, wherein a plurality of client programs operating on client platforms in a customer service centers, optionally in diverse geographical locations, communicate with the OTASP computer program. The OTASP computer program communicates with one or more mobile switching centers (MSC's) to process requests from the client programs and to request communication with mobile telephones using an over-the-air interface, in order to accomplish over-the-air service provisioning.

18 Claims, 5 Drawing Sheets

METHOD AND APPARATUS FOR OVER-THE-AIR SERVICE PROVISIONING OF A MOBILE TELEPHONE

This application is a continuation of U.S. Ser. No. 09/028,071, filed on Feb. 23, 1998.

COPYRIGHT NOTICE/PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the software and its interfaces as described below and in the drawing hereto: Copyright © 1998, ADC NewNet, Inc. All Rights Reserved.

TECHNICAL FIELD OF THE INVENTION

The present invention relates generally to mobile telephone systems, and more particularly to method and apparatus for over-the-air service provisioning of a mobile telephone.

BACKGROUND OF THE INVENTION

Prior to its activation and use in a wireless network, a mobile telephone must be provisioned for service. Provisioning includes, at a minimum, programming the mobile telephone with a telephone number, and programming the wireless network with the serial number and telephone number of the mobile telephone. Thus programmed, the mobile telephone and wireless network are enabled to carry telephone calls between the mobile telephone and the public switched telephone network (PSTN). Provisioning may alsD include programming the wireless network and mobile telephone to support one or more optional features for the mobile telephone, such as call forwarding, three-way calling, voice messaging, short messaging and paging.

To date, provisioning/programming of a mobile telephone has largely been done on the premises of the vendor or distributor of the telephone. A data port on the mobile telephone is used to connect the telephone to a programming system that uploads provisioning data into the telephone, such as the telephone number assigned to the telephone, in order to program it for use in the wireless network. Alternatively, the telephone is programed through its key pad. This approach, while sound and secure, requires the undesirable step of programming/provisioning the mobile telephone before it can be delivered to a subscriber. The ability to deliver a mobile telephone directly to a subscriber without first having to provision the telephone provides obvious advantage in the speed of delivery to the subscriber, and the potential to simplify the provisioning process. Also, the ability to re-provision a mobile telephone over-the-air without returning the phone to a service center also has obvious advantages.

An alternative over-the-air (OTA) service provisioning (OTASP) approach has thus been defined by a standard body so that a mobile telephone can be provisioned over-the-air using the wireless network. The requirements of this standard are defined in IS-683 (also known as PN-3889), published by the Telecommunications Industry Association (T.I.A.), the entire contents of which are hereby incorporated herein by reference. In its most basic form, this approach provides that a mobile telephone is temporarily provisioned to allow a subscriber using the telephone to call a customer service center, through which long-term provisioning can be obtained. The service center establishes a provisioning communication link with the mobile telephone through the SS7 network and the mobile switching center (MSC) supporting the call. Using this communication link, the mobile telephone can be provisioned over-the-air by wireless short message commands sent to the telephone, and using provisioning information sent by the mobile telephone back to the service center over the communication link.

While the IS-683 standard specifies the basic messaging to be supported by the mobile telephone and the wireless network to facilitate OTA provisioning, it does not specify a system-level architecture for the software and systems required to support and implement the messaging. The present invention addresses these architectural needs.

SUMMARY OF THE INVENTION

The present invention provides a method, system and software architecture facilitating over-the-air (OTA) service provisioning (OTASP) of a mobile telephone, from a customer service center, through a mobile switching center (MSC) over the SS7 network. According to one embodiment of the invention, object-oriented OTASP software executes on a UNIX platform and communicates, on the one hand, in a TCP/IP protocol with client software located at a remote customer service center, and, on the other hand, using the SS7 network, with the MSC. By this architecture, the client software may send and receive messages and provisioning data to a mobile telephone supported by the MSC, through the OTASP software and the SS7 network.

According to another embodiment of the invention, multiple instances of the OTASP software may be instantiated on the UNIX platform, wherein each instance supports a different mobile telephone standard, such as CDMA and TDMA. Furthermore, each instance of the OTASP software may initiate multiple simultaneous sessions each supporting the provisioning of a different mobile telephone. In addition, the client-server architecture allows a plurality of clients to communicate with the OTASP software simultaneously, and allows such clients to be located in locations remote from one another.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Architecture

Figure 1:
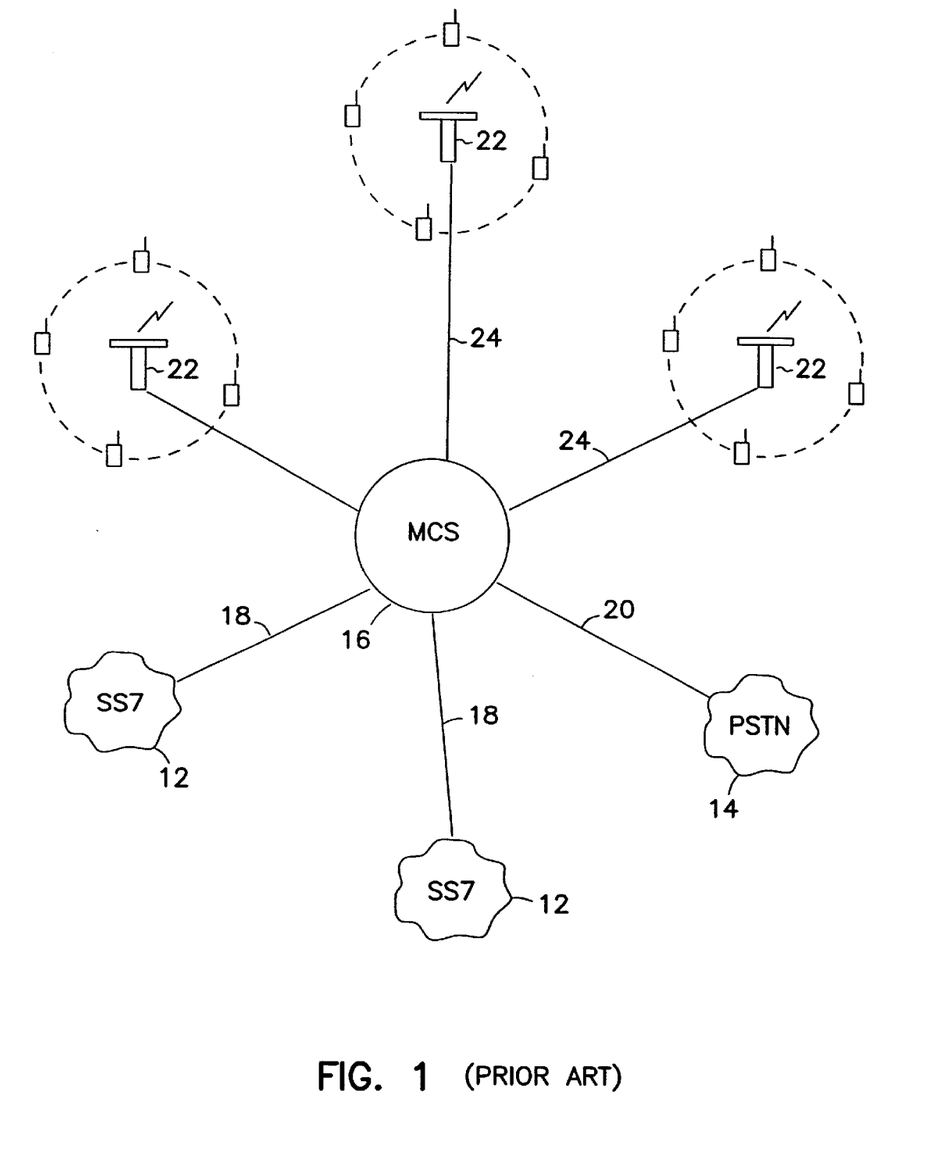
FIG. 1 illustrates a wireless network and its interconnection with the SS7 signaling network and the public switched telephone network.

Referring to FIG. 1 there is illustrated a wireless network 10 and its interconnection with the SS7 signaling network 12 and the public telephone switching network (PSTN) 14. Wireless network 10 includes a mobile switching center (MSC) 16, which is interconnected with the SS7 signaling network 12 through a SS7 data link 18, and to the PTSN 14 over trunk line(s) 20. Wireless network 10 further includes a plurality of RF units 22, which are connected to the MSC 16 over data links 24. The operation of this configuration is conventional, with telephone calls being routed between mobile telephone units 26 and the PTSN 14 through MSC 16 and RF units 22.

Figure 2:
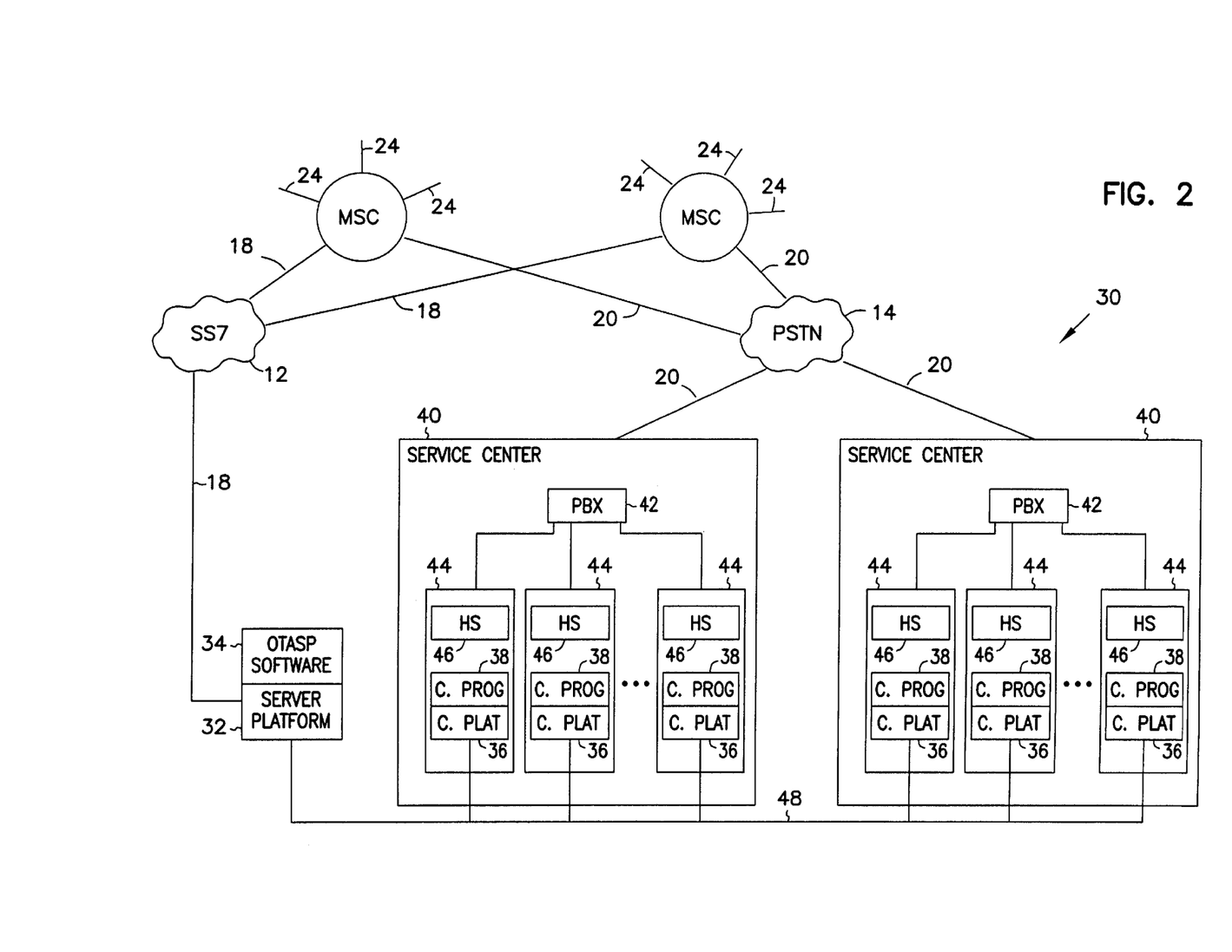
FIG. 2 illustrates the over-the air service provisioning system of the present invention deployed for operation in a telephone system.

Referring to FIG. 2 there is illustrated in simplified form an over-the-air (OTA) client-server provisioning system 30, deployed in a telephone network, according to the present invention. System 30 includes a server platform 32, maintaining over-the-air service provisioning (OTASP) software 34, and one or more client platforms 36, executing client software 38. Client platforms 36 are located in a customer service center (CSC) 40 and constitute part of respective customer service stations 44. A PBX 4 is located at the service center 40, and interfaces the PTSN 14 to a handset/headset 46 at each customer service station (connection not shown). Optionally, PBX 42 is also coupled to each client platform 36. A network connection 48 connects platforms 36 and platform 32. Network connection 48 preferably uses a TCP/IP protocol and may take the form of a wide area network connection, a local area n4,twork connection, or a connection through the Internet Platform 32 is coupled to MSC 16 over SS7 data links 18 and SS7 network 12. Platform 32 can be co-located in the same building as platforms 36, or can be located remotely therefrom. Th platform 32 of the example embodiment described herein is a single server commuter system, such as a SUN Solaris™ server, with a single operating system.

Figure 3:
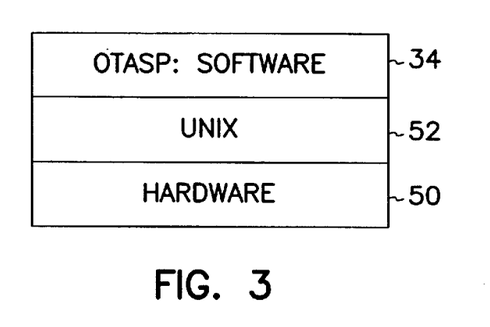
FIG. 3 illustrates the hardware software platform for the over-the-air service provisioning system of the present invention.

Referring to FIG. 3, there is illustrated in simplified form platform 32 and the OTASP software 34 operative there on. Platform 32 includes computer hardware 50, preferably, but not limited to, a high-performance workstation, with a multitasking operating system 52, such as UNIX or Windows NT. OTASP software 34 is an object-oriented application executing on platform 32. Platform 32 is also preferably configured with one or more SS7 I/O circuits to connect platform 32 to the SS7 network.

Figure 4:
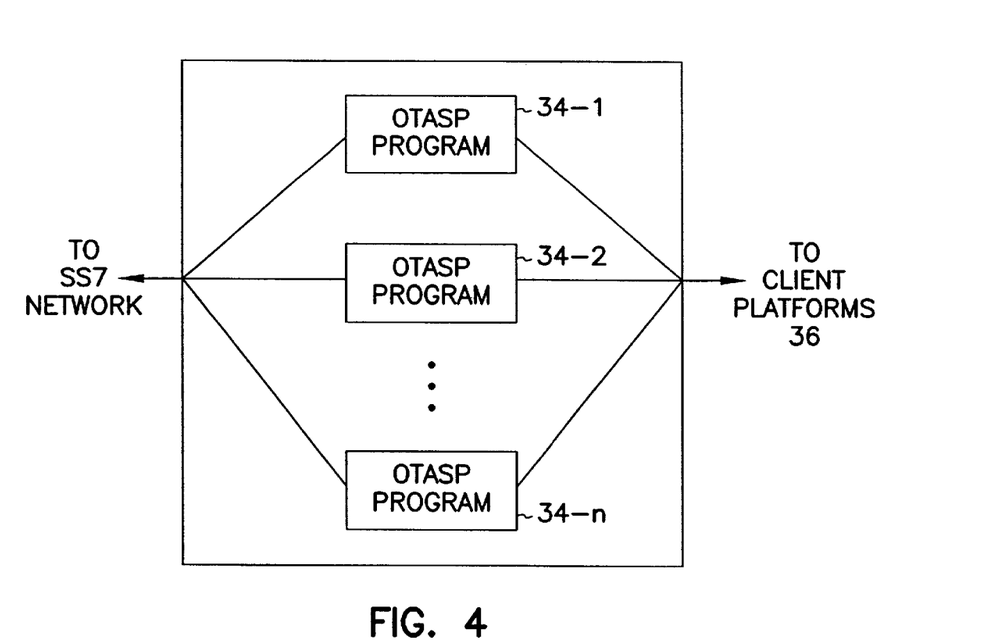
FIG. 4 is a schematic representation of the operation of the over-the-air service provisioning server software of the present invention.

Referring to FIG. 4, there is illustrated in conceptual diagrammatic form a representation of multiple instantiation of OTASP software 34 (denoted 34-1, 34-2, 34-n in FIG. 4), each executing simultaneously on platform 32. Each of OTASP software 34 communicates with one or more client platforms 36, and more specifically client software or program 38 executing on platforms 36. In the example embodiment illustrated herein, each instance of OTASP software 34 (34-1, 34-2, 34-n) is configured to carry out the provisioning of a wireless network of a specific type. For example, a first instance 34-1 is co figured to provision mobile telephones 26 in a CDMA-based wireless network, while another instance 34-2 is configured to provision mobile telephones 26 in a TDMA-based wireless network. As described below in more detail, each instance of OTASP software 34 can handle multiple provisioning sessions simultaneously, each controlled by the same or a different one of client programs 38, wherein each client program 38 resides on a client platform 36, and wherein the client platforms 36 may be located physically or geographically apart from one another. Furthermore, it is possible that each instance of OTASP software 34 is programmed to communicate with one or more different MSC's 16. Accordingly, the embodiment of the invention herein described advantageously allows a single server platform 32, running multiple instances of OTASP software 34, to handle provisioning of mobile telephones 26 of different types, operating using a different wireless mode (e.g., TDMA, CDMA or others), from client programs 38 located in diverse geographical locations. Thus, a wireless service provider operating different types of wireless networks can handle all OTA provisioning for their networks with a single server platform 32 and package of OTASP software 34.

In the example embodiment herein described, OTASP software 34 is an object-oriented program, for example written in the C++ computer language. Client program 38 may also be an object-oriented program. However, the client-server software of the invention is not limited to implementation in an object-oriented language, or to implementation in the C++ language.

In one example embodiment of the invention, a customer service representative is positioned at each customer service station 44. The customer service representative receives telephone calls from subscribers seeking to provision their mobile telephone 26, either upon initial use of the mobile telephone 26 or at a later point in time when, for example, a change in service options or carrier is desired. The customer service representative can provision the subscriber's mobile telephone 26 over-the-air using the client program 38 and an instance of OTASP software 34, which in turn operates in conjunction with the MSC 16. As illustrated in simplified schematic form in FIG. 5, each instance of OTASP software 34 can simultaneously process a plurality of sessions 50 (denoted 50-1, 50-2, 50-n in FIG. 5). Each session 50, as described in more detail below, handles the provisioning of a mobile telephone 26, as directed by a client program 38.

Figure 5:
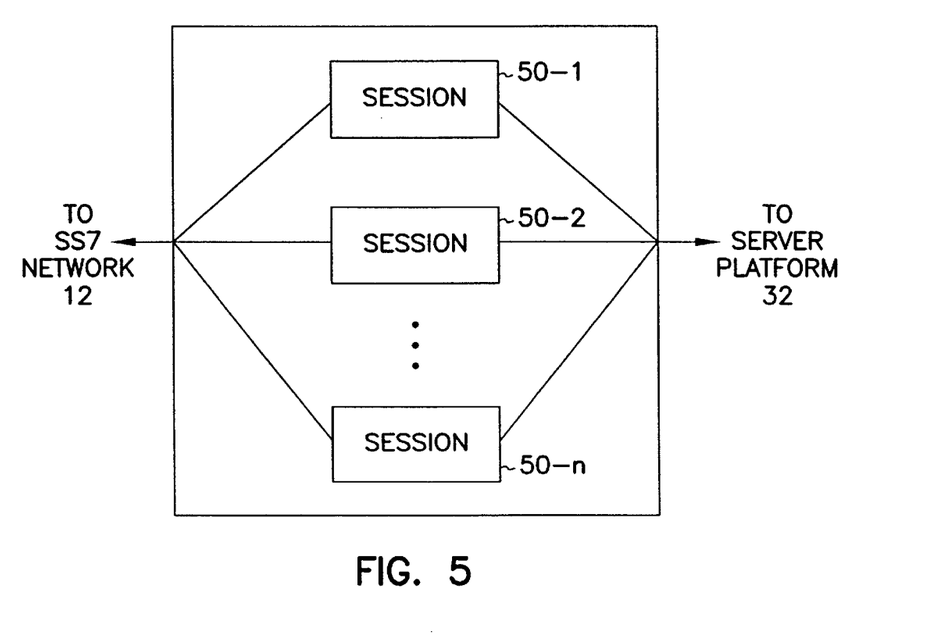
FIG. 5 is a schematic representation of the over-the-air service provisioning software handling multiple sessions according to the present invention.

OTASP software 34 and MSC 16 (and in particular the computers associated therewith) are designed to support the IS-683 standard, allowing for OTA provisioning of a mobile telephone 26, as discussed in more detail below. A client program 38 includes a user interface for interacting with customer service representative, allowing the representative to control the provisioning process from the customer service station 44. Alternatively, client program 38 may be configured to include a voice response system and allow that provisioning can be conducted automatically in whole or in part, by automated interaction with a subscriber over the subscriber's mobile telephone 26 wherein a subscriber may enter selections using the keypad of the mobile telephone, or by voice commands interpreted by the client program 38.

Operation

Overview

In order to provision mobile telephones 26 using the system of the present invention, each client platform 36: 1) establishes a network connection with the OTASP platform 32; 2) sends a number of request messages to the OTASP platform 32; and 3) processes response messages from the OTASP platform 32. Through this interaction, the client platform 36 can request information from and provide provisioning instructions and data from/to MSC 16 and mobile telephones 26. This interaction thus allows a mobile telephone 26 to be provisioned pursuant to IS-683. As noted above, in the example embodiment of the invention herein described, communication between the client platform 36 and the OTASP platform 32 is carried out using a TCP/IP protocol, although the invention is in no way limited in this aspect.

Figure 6:
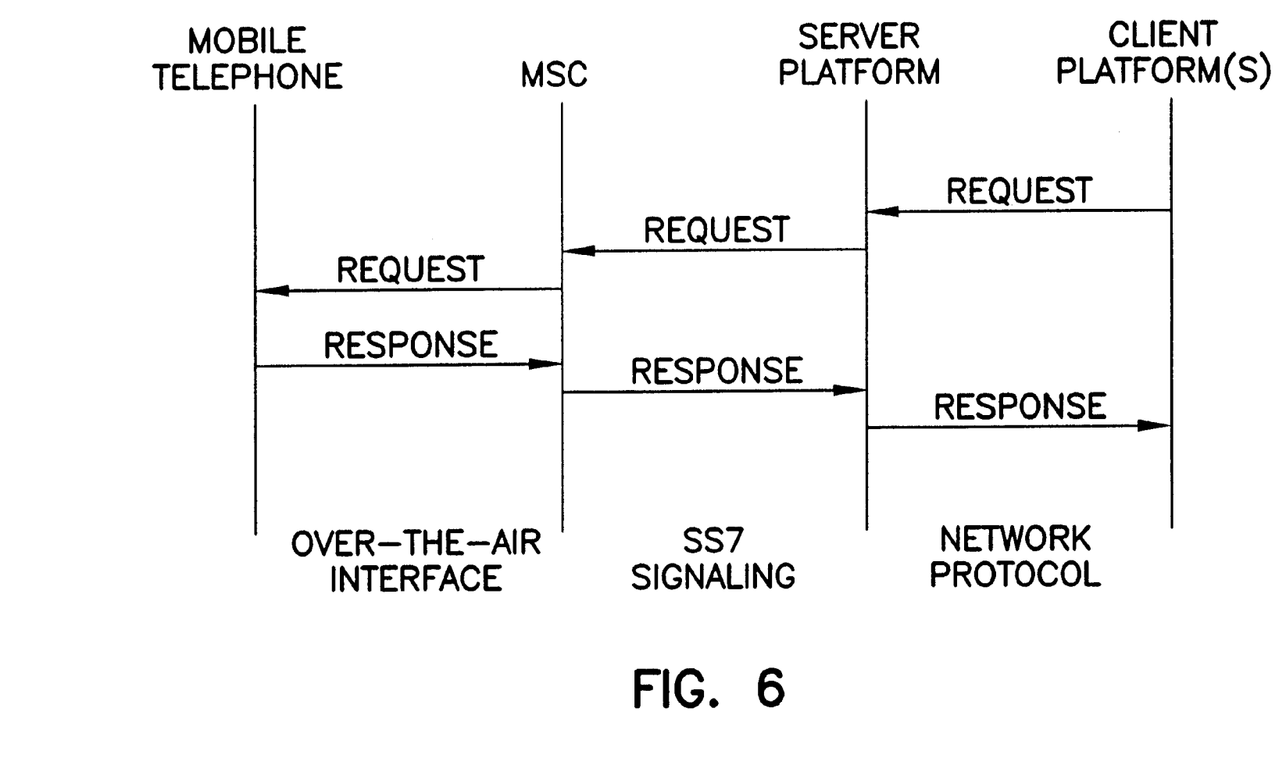
FIG. 6 illustrates the messaging interaction of the client-server over-the-air service provisioning system of the present invention.

FIG. 6 illustrates the messaging flow for communications between client program 38, OTASP software 34, MSC 16 and mobile telephone 26. Requests originate with the client program 38, and are responded to by OTASP software 34. If a request from the client program 38 requires interaction between the OTASP software 34 and the MSC 16, the OTASP software 34 and MSC 16 exchange request-response messages prior to the response from the OTASP software 34 to the client program 38. Requests to the MSC 16 which require an exchange with a mobile telephone 26 result in a request-response exchange between MSC 16 and the mobile telephone 26.

Session Initiation

To initiate a session 50 on an instance of the OTASP software 34, an open session request message is sent by the client program 38 to the OTASP software 34. The client program 38 assigns a client session ID to the session, and forwards the ID to the OTASP software 34. This client session ID is used for all subsequent messages regarding this session.

Upon receipt of this request message, OTASP software 34 allocates the resources needed (e.g. memory, etc.) for this session. Upon resource allocation a session response is returned, which includes a server session ID. Both the client program 38's origination ID and this server ID must be used in all subsequent messages for identification. In the example embodiment herein presented, each message includes, at a minimum, the client session ID, the server session ID, and a result parameter indicating whether the operation was successful or not (i.e., if the resources could be allocated, etc.) If the result parameter indicates a success, the message interaction between the client program 38 and the OTASP software 34 continues for this session. If the result indicates failure, the OTASP software 34 procedure is preferably terminated.

Data Connection

Once a session is established, the server program 38 sends a data connection request to the OTASP software 34, which in turn establishes a data connection with an MSC 16. The data connection request preferably includes the client ID, server ID, and a temporary routing number (TRN) hat the client program 38 supplies to the OTASP software 34. The TRN is obtained at the service center 40 from the incoming call from the subscriber seeking provisioning of a mobile telephone 26. The TRN is obtained from the digital routing information forwarded over the PSTN 14 in connection with the call from the subscriber. The TRN can be automatically extracted from the line from the PTSN 14 and supplied to client program 38, or it can be obtained by a service representative by viewing a data display unit at the representative's customer service station 44 in the service center 40 or by other means.

Using the TRN, the OTASP software 34 looks up the MSC routing information in a temporary routing number table maintained on the platform 32. Using this routing information, the OTASP software 34 sends an SMDPP message requesting the MSC 16 to communicate with the OTASP platform 32 for the call. The MSC 16 responds with an smdpp message which specifies the following parameters:

1) the mobile telephone's electronic serial number (ESN);
2) the mobile identification number (MIN—mobile subscriber phone number in IS41-C) which is currently in the mobile telephone 26's permanent memory;
3) the ID for the MSC 16; and
4) the MSC's authentication capabilities.

Upon successful receipt of the smdpp message, the OTASP software 34 sends and SMDPP message that instructs the MSC to release the TRN. According to this example embodiment, this second SMDPP contains the following parameters, as do subsequent SMDPP messages:

1) a SMS_BearerData field (with length set to zero);
2) a SMS_TeleServiceIndentifier field (with length set to zero);
3) an ActionCode set to Release TRN to release the TRN assigned to the mobile telephone 26;
4) an electronic serial number (ESN) set to value received from MSC;
5) a MIN set to activation MIN assigned by OTASP software 34; and
6) a ServiceIndicator set to [Service type—such as CDMA] OTASP service.

The MSC 16 responds to this message with an smdpp message which contains no parameters.

Once the communication with the MSC 16 is finished, the OTASP software 34 sends a data connection response to the client program 38 specifying:

1) the client session ID assigned to the session by the client program 38;
2) the server session ID assigned to the session by the OTASP software 34 in Session Initiation;
3) a result that indicates whether this operation was successful or not;
4) the mobile telephone's electronic serial number;
2) the MIN which is currently in the mobile telephone 26's permanent memory;
3) an ID for the MSC 16, and
4) the MSC's authentication capabilities.

If the result parameter indicates a success, the message interaction between the client program 38 and the OTASP software 34 continues for this session. If the result parameter indicates failure, the client program 38 means terminate the procedure.

Communicating with the MSC and Mobile Telephone Protocol Capability

The client program 38 uses the protocol capability request message to request the mobile telephone 26 to send back its capabilities. This message is sent to the OTASP software 34 which forwards the request through the MSC 16 to the mobile telephone 26. This data message and the response, are encoded in IS-683 format in the SMS_BearerData portion of the SMDPP and smdpp. When the OTASP software 34 receives the request message, it encodes an IS-683 message and sends it to the MSC 16 in an SMDPP. The MSC 16 sends the request to the mobile telephone 26. When the MSC 16 receives a reply, it sends it in a smdpp message to the OTASP software 34. When the OTASP software 34 receives the smdpp from the MSC 16, it builds a protocol capability response and sends it to the client program 38. If the System Selection for Preferred Routing (SSPR) feature of IS-683 is supported, the SSPR procedures will take place during the download message. The protocol capability response indicates the features supported by the mobile telephone 26.

System Programming Lock (SPL) Validation

The SPL validation procedure may be performed if the protocol capability response from the mobile telephone 26 indicates that the mobile telephone 26 supports the programming lock feature. The SPL protects access to the mobile telephone 26 programming module which contains the NAM indicators and parameters that can be assigned values during over-the-air service provisioning. The SPL parameter contains the Service Programming Code (SPC) used for unlocking the mobile telephone 26 parameters for programming or reprogramming. The SPL request requests data which will be encapsulated within SMS_BearerData.

When the OTASP software 34 receives the request message, it sends an SMDPP message to the MSC 16. The SMDPP contains an IS-683 encoded message with the request. The MSC 16 sends the request to the mobile telephone 26. When the MSC 16 receives a reply, it sends the reply to the OTASP software 34 in an smdpp message. The smdpp contains, is the SMS_BearerData field, the OTASP data message received from the mobile telephone 26 over-the-air interface.

When the OTASP software 34 receives the smdpp from the MSC 16, it builds the SPL response and sends it to the client program 38. The SPL response contains the SPL response data returned in SMS_BearerData received from the MSC 16.

Configuration

The client program 38 sends a configuration request to request the mobile telephone 26 to send relevant data currently stored in its permanent memory. The messages goes through the OTASP software 34 and the MSC 16. The configuration request contains a configuration request data which will be encapsulated within SMS_BearerData.

When the OTASP software 34 receives the request message, it encodes an IS-683 message and sends it to the MSC 16 in an SMDPP.

The MSC 16 receives a response from the mobile telephone 26 and forwards it to the OTASP software 34 in an smdpp. The smdpp contains the OTASP data message received from the mobile telephone 26 over the air interface.

The configuration response includes the configuration response data from the mobile telephone returned in SMS_BearerData received from the MSC 16.

Download

When the client program 38 is ready to activate the mobile telephone 26, it sends a download request message to the OTASP software 34. The message contains data that will be downloaded by the mobile telephone 26 into its temporary memory. The download request contains the download request data which will be encapsulated within the SMS_BearerData field sent to the MSC 16 by the OTASP software 34.

When the OTASP software 34 receives the request message, it encodes an IS-683 message and sends it to the MSC 16 in an SMDPP.

The MSC 16 receives a response from the mobile telephone 26 and forwards it to the OTASP software 34 in an smdpp. The smdpp contains the OTASP data message received from the mobile telephone 26 over-the-air interface.

The download response to the client program 38 from the OTASP software 34 contains the download response data returned in the SMS_BearerData field from the MSC 16.

SSPR Configuration

The goal of system selection for referred roaming (SSPR) is for the mobile telephone 26 to acquire the most preferred system using the information from the preferred roaming list stored in the mobile telephone 26. Before the roaming list can be downloaded, SSPR configuration messages are exchanged between the OTASP software 34 and the mobile telephone 26 to determine the amount of memory that the mobile telephone 26 has available to store the preferred roaming information. After this SSPR Configuration procedure is completed, the SSPR download procedure can take place. The SSPR configuration request contains the SSPR configuration request data which will be encapsulated within the SMS_BearerData field.

When the OTASP software 34 receives the request message, it sends an SMDPP message to the MSC 16. The SMDPP contains the request data encapsulated in an IS-683 encoded message.

The MSC 16 in turn sends the request to the mobile telephone 26. When the MSC 16 receives a reply, it sends it in n smdpp message to the OTASP software 34. The smdpp contains, in the MS_Bearer data field, the OTASP data message received from the mobile telephone 26 over-the-air interface.

When the OTASP software 34 receives the smdpp from the MSC 16, it builds an SSPR configuration response and sends it to the client program 38. The SSPR configuration response message contains the requested parameters of the configuration response data along with a result code for each requested parameter returned in SMS_BearerData received from the MSC 16. The client program 38 examines the result codes returned for each parameter. If any of the result codes indicate a failure, the OTAF procedure may be terminated.

SSPR Download

The purpose of the System Selection for Preferred Roaming (SSPR) List download is to load the mobile telephone 26 with the preferred roaming information. After the SSPR Configuration message exchange between the OTASP software 34 and the mobile telephone 26, the roaming list download procedure takes place. The SSPR Download request contains SSPR download request data which will be encapsulated within SMS_BearerData.

When the OTASP software 34 receives the request message, it sends an SMDPP message to the MSC 16. In the SMS_BearerData field.

The MSC 16 sends the request to the mobile telephone 26. When the MSC 16 receives a reply, it sends the reply to the OTASP software 34 in an smdpp message. The smdpp contains the OTASP data message received from the mobile telephone 26 over-the-air interface.

When the OTASP software 34 receives the smdpp from the MSC 16, it builds an SSPR Download response and sends it to the client program 38. The response contains the SSPR download response data returned in SMS_BearerData received from the MSC 16.

Commit

If the download procedure was successful, the client program 38 sends the commit request message to direct the mobile to transfer all the data that has been downloaded during the current session to permanent memory. This IS-683 message is encapsulated within the SMS_Bearer Data. When the OTASP software 34 receives the request message, it encodes an IS-683 message and sends it to the MSC 16 in an SMDPP.

The MSC 16 receives a response from the mobile telephone 26 and forwards it to the OTASP software 34 in an smdpp. The smdpp contains the IS-683 encoded data message received from the mobile telephone 26 over-the-air interface. The commit response contains the commit response data returned in SMS_BearerData received from the MSC 16.

Registration Request

After the commit procedure has completed successfully, a new MIN has been programmed into the mobile telephone 26. This new MIN must be transferred to the MSC 16. Since the phone is already powered on, the MSC 16 must initiate the registration to the home location register (HLR) with the new MIN and de-registration with the old MIN (if successful registration had occurred with the old MIN). The registration request contains the new MIN that is now programmed into the mobile telephone 26.

When the OTASP software 34 receives the request message, it sends an SMDPP message to the MSC 16. The SMDPP contains:

1) an ActionCode set to Initiate Registration Notification;
2) the ESN set to the value received from MSC 16;
3) the MIN set to the activation MIN assigned by OTASP software 34; and
4) a new MIN received from client program 38; and
5) a ServiceIndicator set to the Appropriate service type (e.g. CDMA).

The MSC 16 responds with an smdpp message which contains no parameters. The OTASP software 34 sends a response to the client program 38. The response indicates whether the operation was successful or not (i.e., if the TCAP queries were responded to successfully or if a reject message was received).

New MIN Notification Request

After successfully assigning a new MIN to a mobile telephone 26, the client program 38 may determine that the OTASP software 34 should be notified of the newly assigned MIN. The client program 38 would send the registration request message, which contains the new MIN that is now programmed into the mobile telephone 26, to the OTASP software 34.

When the OTASP software 34 receives the request message, it sends an SMDPP message to the MSC 16. The SMDPP contains an ActionCode set to record a new MIN, a MIN set to the activation MIN assigned by the OTASP software 34, and a new MIN received from client program 38.

The MSC 16 responds with an smdpp message which contains no parameters.

The OTASP software 34 sends a response to the client program 38. The response contains an indication whether this operation was successful or not (i.e., if the TCAP queries were responded to successfully or if a reject message was received).

MS Key

The A-Key exchange procedure is invoked to exchange key parameters between the authentication center and the mobile telephone 26. For this purpose, the client program 38 sends an MS Key Request to the OTASP software 34. The MS Key request contains the MS Key request data which will be encapsulated within SMS_BearerData.

When the OTASP software 34 receives the request message, it sends a request for key-exchange generate keys to an authentication center. After receiving the key values from the authentication center, the OTASP software 34 encodes an IS-623 message and sends it to the MSC 16 to be sent to the mobile telephone 26 in the SMS_BearerData field.

The MSC 16 sends the message to the mobile telephone 26. When the MSC 16 receives a reply, it sends it to the OTASP software 34 in an smdpp message. The smdpp includes the OTASP data message received from the mobile telephone 26 over-the-air interface.

When the OTASP software 34 receives the smdpp from the MSC 16, it builds an MS Key response and sends it to the client program 38. The response contains the MS Key response data returned in SMS_BearerData received from the MSC 16.

Key Generation

Before the client program 38 sends the Key Generation Request, it should have received the MS Key response message containing a result code indicating a successful operation. The Key Generation request message contains Key generation request data which will be encapsulated within SMS_BearerData.

When the OTASP software 34 receives the request message, it creates and sends a IS-683 encoded message to the MSC 16 that requests the mobile telephone 26 to generate A-key.

The MSC 16 sends the message to the mobile telephone 26. When the MSC 16 receives a reply, it sends it to the OTASP software 34 in an smdpp message. The smdpp contains the OTASP data message received from the mobile telephone 26 over-the-air interface.

When the OTASP software 34 receives the smdpp from the MSC 16, it builds a Key Generation response and sends it to the client program 38. The response contains the Key generation response data returned in SMS_BearerData received from the MSC 16.

Re-Authentication

The purpose of the Re-Authentication procedure is to initiate the Voice Privacy and/or Signaling Message Encryption (VP/SME) features during an OTASP call. This procedure can occur following the successful completion of an A-Key exchange (MS Key) procedure or a Shared Secret Data (SSD) update procedure. The re-authentication procedure does not program any new information into the mobile telephone 26. The re-authentication request contains the Re-Authentication request data which will be encapsulated within SMS_BearerData.

When the OTASP software 34 receives the request message, it sends an SMDPP message to the MSC 16. The SMDPP contains IS-683 encoded message and the ESN set to the value received from the MSC in the data connection procedure described above, and the activation MIN assigned by the OTASP software 34.

The MSC 16 sends the request to the mobile telephone 26. When the MSC 16 receives a reply, it sends it to the OTASP software 34 in an smdpp message. The smdpp contains the OTASP data message received from the mobile telephone 26 over-the-air interface.

When the OTASP software 34 receives the smdpp from the MSC 16, it builds a Re-Authentication response and sends it to the client program 38. The response contains the Re-Authentication response data.

Session Closure

A service provisioning session must always be closed with a close session request so that the OTASP software 34 can release the resources that were allocated. A session should be closed when a service provisioning session has successfully completed, the client program 38 determines that a response received from the OTASP software 34 or the MSC 16 has failed, or the client program 38 is no longer able to proceed with this session. When a session is closed, all unacknowledged messages (smdpps) from the MSC 16 will be discarded. When the OTASP software 34 receives the request from client program 38, it releases the resources of the session and sends back a response.

Session Termination

Normally, the client program 38 terminates a service provisioning session with a message to the OTASP software 34. However, the OTASP software 34 will terminate a session if no activity occurs over the interface or if the session is open too long. By default, the OTASP software 34 allows a session to remain open for 80 seconds. This length of time can be changed with a command sent by the client program 38. If a session is still open after the configured amount of time, the OTASP software 34 sends a session termination message. Upon termination of the session, the OTASP software 34 releases all resources that were allocated for the session and discards all unacknowledged messages (smdpps) from the MSC 16.

Alternate Embodiments

The present invention is in no way limited to the example embodiment described herein. As noted above, the invention is not limited to object-oriented software. Nor is it limited to any particular type of hardware or operating system platforms, or client-server or network architecture. For example, the client-server interaction may be performed over the Internet using a web-browser/server/Java application. Moreover, the messaging system of the invention may also be implemented in alternate ways without departing from the scope of the invention. Furthermore, the software of the invention may also be implemented in whole or in part in hardware, and vice versa.

Conclusion

Thus, the example embodiment of the invention described above provides a client-server architecture and messaging interface for over-the-air service provisioning of mobile telephone services using the IS-683 standard. The embodiment of the invention herein described advantageously allows a single server platform 32, running multiple instances of OTASP software 34, to handle provisioning of mobile telephones 26 of different types, operating using a different wireless mode (e.g., TDMA, CDMA or others), from client programs 38 located in diverse geographical locations. Thus, a wireless service provider operating different types of wireless networks can handle all OTA provisioning for their networks with a single server platform 32 and package of OTASP software 34.

What is claimed is:

1. An over-the-air service provisioning (OTASP) system for provisioning service for a mobile telephone through a mobile switching center (MSC) communicating with the mobile telephone over a wireless network, the OTASP system configured to interact with a plurality of client platforms connected to each other over a computer network in a client server architecture;

the OTASP system comprising:
a server platform having a single server computer system connected for communication to at least one MSC over a signaling network;
one or more instances of an OTASP computer program executing on the server platform, wherein each instance handles OTASP for a different type of wireless service;
each instance of OTASP computer program configured to support one or more OTASP sessions, wherein each session is initiated by one of the client platforms, wherein the OTASP computer program is configured;
a) to respond to a request from the client platform by sending a request to the MSC over the signaling network, wherein the request sent to the MSC instructs the MSC to obtain information from the mobile telephone;
b) to receive a reply from the MSC, the reply corresponding to the request sent to the MSC; and
c) to respond to the reply from the MSC by sending a corresponding reply to the client platform over the computer network; and
wherein the requests and responses sent between the client platform, the OTASP computer program and the MSC accomplishes the service provisioning of a mobile telephone over-the-air.

2. A system according to claim 1 wherein each instance of the OTASP computer program executes on the server platform simultaneously.

3. A system according to claim 2 wherein each instance of the OTASP computer program is configured to handle a plurality of sessions simultaneously.

4. A system according to claim 1 wherein the service type is CDMA or TDMA.

5. An over-the-air service provisioning (OTASP) computer software product, comprising:
object-oriented OTASP computer software encoded on a machine readable media, the OTASP computer software executable on a serve platform to form one or more instances of an OTASP object-oriented computer program, wherein each instance of the OTASP computer program instance handles OTASP for a different type of wireless service, and wherein each instance of OTASP computer program executes on the server platform and supports one or more OTASP sessions, wherein the OTASP computer software includes instructions for:
a) receiving a client request generated by a client connected to the server;
b) in response to the client request, sending a request to a MSC using a predefined signaling protocol, wherein the request includes data to be used by the MSC to communicate with a mobile telephone over-the-air;
c) receiving a reply from the MSC in the predefined signaling protocol, wherein the reply from the MSC includes data obtained from the mobile telephone over-the-air; and
d) in response to the reply from he MSC, sending a reply to the client;
wherein the requests and responses sent between the client and the OTASP computer program accomplish the service provisioning of the mobile telephone over-the-air.

6. The system according to claim 5, wherein each instance of the OTASP computer program executes on the server platform simultaneously.

7. The system according to claim 5, wherein each instance of the OTASP computer program handles a plurality of sessions simultaneously.

8. The system according to claim 7, wherein each session of the plurality of sessions provisions a different mobile telephone.

9. The system according to claim 5, wherein each session communicates with a different client.

10. The system according to claim 5, wherein the type of wireless service is CDMA or TDMA.

11. The system according to claim 5, wherein the server platform includes a single server computer system.

12. A method for over-the-air service provisioning (OTASP) of a mobile telephone through a mobile switching center (MSC) which communicates with the mobile telephone over a wireless network, comprising the steps of:
executing one or more instances of an OTASP computer program on a server platform connected in a client-server configuration to a plurality of client platforms, and to at least one MSC over a predefined signaling network, wherein each instance handles OTASP for a different type of wireless service and supports one or more OTASP sessions, wherein each session includes the steps of:

a) receiving a client request generated by a client connected to the server;
b) in response to the client request, sending a request to a MSC using a predefined signaling protocol, wherein the request includes data to be used by the MSC to communicate with a mobile telephone over-the-air;
c) receiving a reply from the MSC in the predefined signaling protocol, wherein the reply from the MSC includes data obtained from a mobile telephone over-the-air; and
d) in response to the reply from the MSC, sending a reply to the client;

wherein the requests and responses sent between the client and the instance of the OTASP computer program accomplish the service provisioning of a mobile telephone over-the-air.

13. The method according to claim 12, wherein each instance of the OTASP computer program executes on the server platform simultaneously.

14. The method according to claim 12, wherein each instance of the OTASP computer program handles a plurality of session simultaneously.

15. The method according to claim 14, wherein each session of the plurality of sessions provisions a different mobile telephone.

16. The method according to claim 12, wherein each session communicates with a different client.

17. The method according to claim 12, wherein the type of wireless service is CDMA or TDMA.

18. The method according to claim 12, wherein the server platform includes a single server computer system.

* * * * *